United States Patent [19]

Kato

[11] 4,443,821
[45] Apr. 17, 1984

[54] DIGITAL VELOCITY ERROR COMPENSATOR

[75] Inventor: Tetsuro Kato, Atsugi, Japan

[73] Assignee: Sony Corporation, Tokyo, Japan

[21] Appl. No.: 332,250

[22] Filed: Dec. 18, 1981

[30] Foreign Application Priority Data

Dec. 22, 1980 [JP] Japan .............................. 55-182493

[51] Int. Cl.³ .......................................... H04N 9/491
[52] U.S. Cl. .................................................. 358/326
[58] Field of Search ............... 358/315, 316, 320, 321, 358/325, 327, 337, 338, 339, 326, 19; 360/36.1

[56] References Cited

U.S. PATENT DOCUMENTS

| | | | |
|---|---|---|---|
| 3,860,952 | 1/1975 | Tallent et al. | 358/19 |
| 4,081,826 | 3/1978 | Ninomiya | 358/326 |
| 4,165,524 | 8/1979 | Ninomiya | 35/326 |
| 4,393,413 | 7/1983 | Kaneko | 358/326 |

*Primary Examiner*—John C. Martin
*Assistant Examiner*—Erin A. McDowell
*Attorney, Agent, or Firm*—Lewis H. Eslinger; Alvin Sinderbrand

[57] ABSTRACT

A velocity error compensator is provided for use in a time base corrector of the type having a memory into which successive samples of a periodic information signal, such as a video signal, are written at a write-in rate that is synchronized with time base errors in the information signal, such that plural periods, such as plural lines, of the information signal are stored in the memory, and from which the successive samples are read at a constant read-out rate. The velocity error compensator comprises a velocity error detector for detecting velocity errors in successive periods, or lines, of the information signal written into the memory; and a sample level compensator for compensating the level of a sample read out from the memory as a function of the detected velocity error, such that the level of the read out sample is modified to be equal to the level that the read out sample should have had at the time it was read out if there had been no velocity error.

20 Claims, 12 Drawing Figures

DIGITAL VELOCITY ERROR COMPENSATOR

BACKGROUND OF THE INVENTION

This invention relates to a velocity error compensator and, more particularly, to a digital velocity error compensator that is used in a time base corrector, such as a video signal time base corrector.

Time base errors, which are frequency and/or phase errors, often are introduced into information signals that are reproduced from a record medium. For example, when video signals are recorded on a magnetic tape, such as by a video tape recorder (VTR), time base errors may be introduced into those video signals when they are played back. Such time base errors are due to, for example, expansion or contraction of the magnetic tape after the video signals have been recorded thereon; a change in the speed at which the magnetic tape is driven during the playback mode than during the recording mode; changes in the speed at which the playback heads scan the magnetic tape during recording and playback modes in a so-called helical-scan VTR; and the like. When the reproduced video signals are displayed on a television monitor, or receiver, the time base errors that may be present therein appear as undesired effects such as jitter, brightness distortion, erroneous color display, and the like.

Time base correctors are known whereby the aforementioned time base errors are substantially eliminated from the reproduced video signals. One example of a time base corrector is found in U.S. Pat. No. 3,860,952.

Typically, the reproduced video signals are converted from their usual analog form into digital form, and the digitized video signals are stored temporarily in a digital memory. Successive samples of the video signal are written into the memory at a write-in clock rate that is synchronized with the detected time base errors. Once a line of video signal samples is stored, the stored samples are read out, one at a time, at a standard, fixed read-out clock rate. Since the video signal samples are written in in synchronism with the time base errors and are read out at a fixed rate, the time base errors are substantially removed. The read out video signal samples then are reconverted back into analog form and may be displayed, transmitted, or otherwise processed, free of undesired time base errors.

The typical time base corrector of the type described above does not take velocity errors into account. The velocity error of a video signal is the time base error which may exist over all, or a substantial portion, of a horizontal line interval. In typical time base correctors, the horizontal synchronizing signal and usual burst signal are detected at the beginning of a line interval; and the write clock generator which is used to generate write-in clock pulses that are synchronized with the time base error is frequency and phase-locked to such synchronizing and burst signals. The phase-locking of the write-in clock pulses occurs at the beginning of each horizontal line interval because the burst signal is present in the video signal only at that time. There is no adjustment or correction in the phase of the write-in clock pulses throughout the remainder of the horizontal line interval. However, the timing, or phase, of the video signal may vary during that line interval. For example, the phase of the chrominance subcarrier upon which the chrominance component is modulated may vary. It is this unaccounted for time or phase variation of the video signal during the horizontal line interval that is referred to as the "velocity error". Of course, at the end of the line interval or, more accurately, at the beginning of the next-following line interval, the overall extent of the velocity error can be ascertained merely by sensing the amount of phase adjustment that is needed to bring the write-in clock pulses into proper phase synchronism with the burst signal. That is, in the usual automatic phase control (APC) circuit, the write clock phase control signal provides a good indication of the extent of the velocity error which was present in the immediately preceding line interval.

It has been proposed to provide time base correctors of the aforementioned type with velocity error correcting circuitry. For example, in U.S. Pat. No. 4,120,000, the velocity error of each line of reproduced video signals is stored as a velocity error correcting voltage. This voltage is produced by comparing the phase of the time base corrector write-in clock pulses to the phase of the burst signal in each line interval, and the velocity error correcting voltage is produced as a function of any phase differential therebetween. When a line of video signals is read out from the time base corrector memory, the velocity error correcting voltage associated with that line is integrated over a period of time equal to a horizontal line interval, thus producing a linearly changing velocity error signal, which signal is used to phase modulate the read-out clock pulses. Hence, the video signals are read out of the time base corrector memory at a phase-modulated rate which is assumed to be a close approximation of the actual velocity error that was present in the line of video signals that had been written into the memory.

In the aforementioned patent, the velocity error in each line of video signals written into the time base corrector memory is assumed to vary linearly throughout the entire line interval. Another velocity error corrector which proceeds on this assumption is described in U.S. Pat. No. 4,065,787.

Other velocity error correcting circuits have been proposed wherein the velocity error is assumed to be not necessarily linear, or uniform, throughout the entire line interval. For example, in U.S. Pat. No. 4,165,524, the read-out clock pulses are phase modulated at different rates during a line interval, these different rates being a function of the velocity error that is present in preceding and succeeding line intervals. Also, in copending U.S. Pat. No. 4,393,413, filed Mar. 16, 1981, the velocity errors which are present in three successive line intervals are combined and integrated to produce a nonlinear velocity error correcting signal which then is used to phase modulate the time base corrector memory read-out clock pulses.

In all of the aforementioned velocity error correcting systems, velocity errors are corrected by varying the phase, or times of occurrence of the read-out clock pulses. The video signal samples, which are represented as multi-bit digital signals are read out of the time base corrector memory at phase-adjusted times. Although the effective magnitudes, or values, of the samples are not altered, the phase modulation of the read-out clock pulses results in compensating for the velocity errors when the read-out samples are reconverted back into analog form. Thus, velocity error correction is not made in the digitized video signals but, rather, is effected when the video signals are reconverted into analog form.

It is desirable, in many instances, to obtain a velocity error-corrected digital video signal. In accordance with the velocity error correction techniques described above, this has been achieved heretofore only by reconverting the velocity error-corrected analog video signal back into digital form. This, of course, is accompanied by the usual quantization noise and inherent errors in any digital-analog-digital conversion. Thus, it is desirable to provide a digital velocity error compensator so that digital-to-analog conversion and phase modulation of read-out clock pulses can be avoided.

OBJECTS OF THE INVENTION

Therefore, it is an object of the present of the present invention to provide a digital velocity error compensator which avoids the aforenoted disadvantages attending prior art velocity error correcting systems.

Another object of this invention is to provide velocity error compensator apparatus which is particularly useful in a time base corrector that is utilized to correct time base errors that may be present in a video signal.

A further object of this invention is to provide a velocity error compensator which compensates video signal sample levels that are read out from a time base corrector memory such that the compensated samples are substantially free of velocity error.

Another object of this invention is to provide an improved velocity error compensator which compensates the level of video signal samples read out from a time base corrector memory as a function of detected velocity error, such that the level of the read out sample is modified to be equal to the level that it should have had at the time it was read out if there had been no velocity error.

Yet another object of this invention is to provide improved, digital velocity error compensator apparatus that is particularly useful for compensating velocity errors in a video signal, and is more broadly useful for compensating velocity errors that may be present in periodic information signals in general.

Various other objects, advantages and features of the present invention will become readily apparent from the ensuing detailed description, and the novel features will be particularly pointed out in the appended claims.

SUMMARY OF THE INVENTION

In accordance with this invention, velocity error compensator apparatus is provided for use in a time base corrector of the type having a memory into which successive samples of a periodic information signal, such as a composite color video signal, are written at a write-in rate that is synchronized with time base errors in the information signal, such that plural periods, or lines, of the information signals are stored in the memory, and from which the successive samples are read out at a constant read-out rate. A velocity error detector detects velocity errors in successive periods, or lines, of the information signals that are written into the memory. A sample level compensator compensates the level of a sample read out from the memory as a function of the detected velocity error, such that the level of the read out sample is modified to be equal to the level that it should have had at the time it was read out if there had been no velocity error.

In a preferred embodiment of the present invention, the velocity error compensator operates upon a composite color video signal, wherein the successive samples of the video signal which are read out from the memory are separated, preferably by a digital separator, into luminance component samples and chrominance component samples. In accordance with one aspect of this invention, the sample level compensator is comprised of separate luminance and chrominance interpolators for producing compensated luminance and chrominance samples, respectively. The compensated luminance sample $y_Y$ is produced by multiplier circuits which operate to produce the compensated luminance sample in accordance with the expression $y_Y = a_Y(1-x) + b_Y x$, where $a_Y$ and $b_Y$ are consecutive luminance component samples, and x is the velocity error of one of those samples. The compensated chrominance sample $y_C$ is produced by multiplier circuits which operate to produce the compensated chrominance sample in accordance with the expression $y_C = b_C \sin \pi/2x + a_C \cos \pi/2x$, where $a_C$ and $b_C$ are consecutive chrominance component samples, and x is the velocity error of one of these samples. The compensated luminance and chrominance samples are combined to produce velocity error compensated samples of the composite color video signal.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
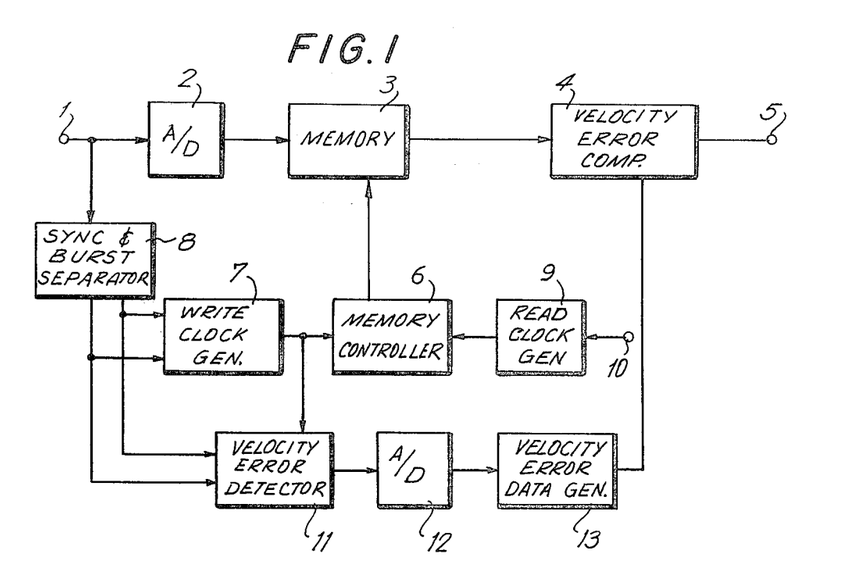
FIG. 1 is a block diagram of a time base corrector wherein the present invention finds ready application.

Referring now to the drawings, and in particular to FIG. 1, there is illustrated a block diagram of a time base corrector with which the present invention finds ready application. For convenience, the time base corrector illustrated in FIG. 1 is described in conjunction with an input composite color video signal, for example, a color video signal reproduced by a video tape recorder. However, in its broader sense, the illustrated time base corrector is adapted to correct time base errors that may be present in a periodic information signal that is supplied thereto from, for example, a signal reproducing device. The illustrated time base corrector is comprised of a memory 3, a memory controller 6, a write clock generator 7, a read clock generator 9, a velocity error detector 11, a velocity error data signal generator 13 and a velocity error compensator 4. Memory 3 may be comprised of a plurality of memory units, each being adapted to store at least one line of video signals therein. The memory preferably is an addressable memory and is controlled by memory controller 6 such that particular memory units therein, and addressable locations in such memory units, are addressed to have digital signals written therein and to have digital signals stored therein read out therefrom. It is appreciated that memory 3 is a typical digital memory device.

The input of memory 3 is coupled to an input terminal 1 via an analog-to-digital (A/D) converter 2. A/D converter 2 is adapted to sample a video signal supplied to input terminal 1 at a sampling rate that is synchronized with time base errors present in the input video signal. Successive samples produced by A/D converter 2 are supplied to memory 3 and are stored in addressed locations of a memory unit that is selected by memory controller 6. In the embodiments described herein, the composite color video signal which is supplied to input terminal 1 has a chrominance subcarrier, upon which the chrominance component is amplitude modulated, having a subcarrier frequence $f_{sc}$. The sampling rate at which the input color video signal is sampled is equal to $4f_{sc}$. The A/D converter samples the input video signal at this sampling rate and converts each sample to a corresponding multi-bit digital signal whose value represents the magnitude of that sample. It is these multi-bit digital samples that are stored in the respective memory units of memory 3.

Input terminal 1 also is coupled to a synchronizing and burst signal separator 8. Separator 8 may be of conventional construction and is adapted to separate from the input composite color video signal the horizontal synchronizing signal and the burst signal which are present at the beginning of each horizontal line interval. In the interest of brevity, further description of sync separator 8 is not provided.

The separated horizontal synchronizing signal and burst signal derived from the input composite color video signal are supplied to write clock generator 7. The write clock generator may be of the type described in U.S. Pat. No. 4,165,524, and is adapted to generate write clock signals having a frequency $4f_{sc}$, this write clock signal being phase synchronized with the separated burst signal. Furthermore, write clock generator 7 includes conventional automatic frequency control (AFC) and automatic phase control (APC) circuits such that the write clock pulses are both frequency and phase synchronized with the separated horizontal synchronizing signal and burst signal. From aforementioned U.S. Pat. No. 4,165,524, it will be appreciated that any time base errors which may be present in the input composite color video signal also are present in the write clock pulses which are synchronized with the horizontal synchronizing and burst signals. Although not shown herein, the write clock pulses generated by write clock generator 7 also are utilized to sample the input video signal in A/D converter 2.

Memory controller 6 may be similar to the memory control circuit described in aforementioned U.S. Pat. No. 4,165,524, and is adapted to receive both the write clock pulses generated by write clock generator 7 and read clock pulses which are generated by read clock generator 9. The memory controller is adapted to select the particular memory units in memory 3 into which one or more lines of video signal samples are written and from which successive lines of video signal samples are read. Since the write clock pulses are synchronized with the time base errors that may be present in the incoming video signal, it is possible, over a period of time, that the very same memory unit might be selected to have video signal samples both written into it and read out from it because the write-in clock rate may be faster or slower than the read-out clock rate. Memory controller 6 operates to prevent such an occurrence.

Read clock generator 9 is coupled to a terminal 10 which is adapted to be supplied with a reference clock signal supplied from a suitable source, such as a crystal oscillator, or the like (not shown). In one embodiment, read clock generator 9 generates read-out clock pulses at the fixed, constant frequency of, for example, $4f_{sc}$. Such read clock pulses are supplied to memory controller 6 and are used to read out consecutive samples of the appropriately selected memory unit of memory 3.

FIG. 1 also includes velocity error correcting circuitry comprised of velocity error detector 11, velocity error data signal generator 13 and velocity error compensator 4. Velocity error detector 11 may be of the type described in aforementioned U.S. Pat. No. 4,165,524 and is adapted to detect the velocity error which may be present in each line of video signals that is written into memory 3. For example, the velocity error detector may include a phase difference detector supplied with the write clock pulses generated by write clock generator 7 and the horizontal synchronizing and burst signals which are separated from the incoming video signal by separator 8. It is appreciated that, at the beginning of a line interval, the write clock pulses generated by write clock generator 7 still are phase-synchronized with the burst signal that was present at the beginning of the preceding line interval. Therefore, the phase difference between the write clock pulses and the burst signal which is separated from the present line interval represents the velocity error of the preceding line interval. Typically, velocity error detector 11 produces an output voltage which is a function of this phase differential.

The output of velocity error detector 11 is supplied to analog-to-digital (A/D) converter 12 which functions to convert the analog voltage produced by the velocity error detector, and representative of the velocity error of the preceding line interval, to a corresponding digital signal. This digitized velocity error voltage is, in turn, digitally integrated over a period of time by velocity error data signal generator 13. As will be described below with respect to FIG. 2, the velocity error data signal generator generates a digitized version of a linearly increasing (or decreasing) signal over one horizontal line interval. It will be appreciated that, if desired, velocity error data signal generator 13 may respond to the digitized velocity error voltage supplied thereto to produce a non-linear representation of velocity error. For the purpose of the present discussion, it is assumed that the velocity error over an entire horizontal line interval increases from zero (at the time that the write clock pulses are phase synchronized with the separated burst signal) to a maximum value (at the end of the line interval, or at the beginning of the immediately following line interval) linearly with respect to time. Velocity error data signal generator 13 produces a digitized version of this linearly increasing signal.

The output of velocity error data signal generator 13, which is a digitized version of a linearly increasing velocity error signal, is supplied to velocity error compensator 4. The velocity error compensator, which is described in greater detail below, also receives successive, or consecutive, video signal samples that are read out from memory 3. It is appreciated that such read out video signal samples exhibit velocity error, which velocity error is compensated by the velocity error compensator. The output of velocity error compensator 4 is coupled to an output terminal 5 which is provided with time base corrected and velocity error compensated video signal samples. As will be explained below, velocity error compensator 4 functions to modify the effective value, or level, of each read out video signal sample such that the level of each sample is made substantially equal to the level that it should have had at the time it was read out from memory 3 if there had been no velocity error. This is explained in greater detail below.

Briefly, in operation, an incoming composite color video signal supplied to input terminal 1 is sampled at the sampling rate of $4f_{sc}$ by A/D converter 2, and each sample is converted to a corresponding multi-bit digital signal. At the sampling rate of $4f_{sc}$, approximately 910 video signal samples are obtained during each horizontal line interval. Each memory unit included in memory 3 thus is adapted to store at least 910 digitized samples.

After a line of video signal samples is stored in a memory unit in memory 3, the velocity error of that line is detected by velocity error detector 11. Preferably, although not shown herein, the velocity error detector includes a velocity error memory such that the velocity error voltage which is produced as each line of video signal samples is written into memory 3 is stored at a location that is associated with that line.

Under the control of memory controller 6, successive lines of video signal samples are read out from memory 3. When a line of samples is read out, the velocity error voltage which had been produced in association with that line is supplied from the velocity error memory (not shown) to A/D converter 12. Hence, at the beginning of each line of video signal samples that is read out from memory 3, a corresponding digitized velocity error signal representing the velocity error of that line is produced by A/D converter 12. This digitized velocity error signal is integrated by the digital integrator included in velocity error data signal generator 13. As will be described with reference to FIG. 2, the digital integrator is supplied with clock pulses at the frequency $4f_{sc}$, which clock pulses may be equal to the constant-frequency read clock pulses generated by read clock generator 9. Such read clock pulses serve to read out successive video signal samples from memory 3. Hence, during each horizontal line interval, 910 successive video signal samples are read out from memory 3 and supplied to velocity error compensator 4. Velocity error data signal generator 13 serves to produce, during this horizontal line interval, 910 successive velocity error data samples, each sample representing the velocity error of a respective one of the video signal samples that then is being read out from memory 3. For example, when the first video signal sample is read out, the velocity error data signal then produced by generator 13 represents the velocity error of that sample. When the next-following video signal sample is read out from memory 3, the velocity error data signal then produced by generator 13 represents the velocity error of that sample. Thus, each video signal sample read out from memory 3 is supplied to velocity error compensator 4 together with a corresponding velocity error data signal representing the velocity error of that video signal sample.

Velocity error compensator 4 utilizes consecutive video signal samples, together with the velocity error data signal representing the velocity error of, for example, the first of such consecutive samples, to compensate, or modify, the level of that first sample. Hence, output terminal 5 is supplied with consecutive velocity error-compensated video signal samples.

Figure 2:
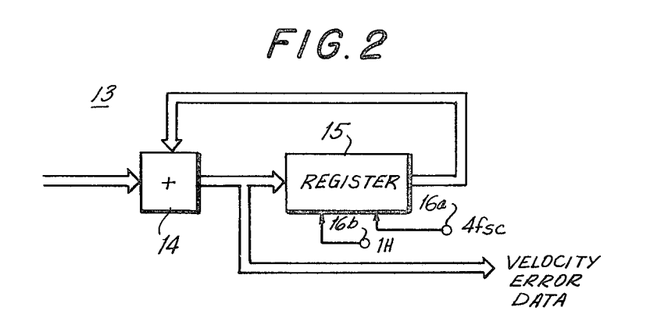
FIG. 2 is a block diagram of a digital integrator which is used in accordance with the present invention to produce velocity error signals.

Turning now to FIG. 2, there is illustrated one embodiment of velocity error data signal generator 13. This generator is comprised of digital circuitry and includes a digital summing circuit 14 whose output is coupled to a digital register 15. The contents of register 15 are fed back to summing circuit 14 and are summed therein with a signal proportional to the velocity error detected by velocity error detector 11 and digitized by A/D converter 12. The output of summing circuit 14, in addition to being supplied to register 15, provides the velocity error data signal to velocity error compensator 4.

Register 15 is provided with a clock pulse input terminal 16a and a reset input terminal 16b. Clock pulses that are synchronized with or equal to the aforementioned read clock pulses are supplied to clock pulse terminal 16a. It is appreciated, therefore, that clock pulses having a repetition rate equal to $4f_{sc}$ are supplied to register 15. Each of these clock pulses serves to load the register with the digital signal supplied thereto by summing circuit 14. Reset terminal 16b is adapted to be supplied with a reset signal having a repetition rate equal to the line read-out rate from memory 3. That is, a reset pulse is supplied to reset terminal 16b when the first video signal sample of a horizontal line interval stored in memory 3 is read out therefrom. Thus, register 15 is reset and its contents are cleared at the beginning of each read out line interval.

Figure 3A:
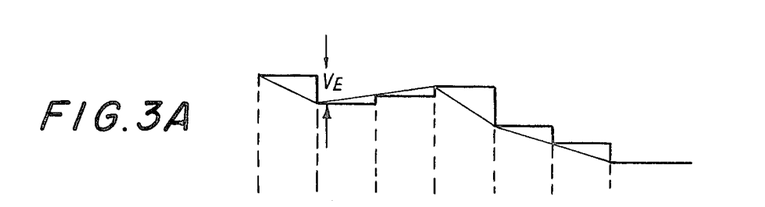
FIGS. 3A and 3B are waveform diagrams which represent the manner in which the velocity error signals are generated.

The manner in which the digital integrator shown in FIG. 2 operates now will be described with reference to the waveform diagrams shown in FIGS. 3A and 3B. FIG. 3A represents the magnitude, at the end of each horizontal line interval of the incoming video signal, by which the phase of the write clock pulses generated by write clock generator 7 differs from the phase of the burst signal which is separated from the incoming video signal. More particularly, FIG. 3A represents the phase control over the write clock pulses. At time $t_{H1}$, at the end of a first line interval (or, stated otherwise, at the beginning of the next-following line interval), the phase of the write clock pulses may be adjusted, or shifted, by the illustrated negative amount in order to be synchronized with the phase of the separated burst signal. This represents the time base error that is present in the first horizontal line interval. At time $t_{H2}$, the phase of the write clock pulses must be shifted by the illustrated positive amount. At time $t_{H3}$, the phase of the write clock pulses must be shifted by the illustrated negative amount, and positive or negative shifts in the phase of the write clock pulses are carried out at the beginning of succeeding line intervals, as represented by times $t_{H4}$ and $t_{H5}$. It is appreciated that the magnitudes of these phase shifts which must be made to bring the write clock pulses into synchronism with the separated burst signals are produced as velocity error voltages by velocity error detector 11. Hence, in FIG. 3A, velocity error detector 11 produces the velocity error voltage $V_E$ at time $t_{H1}$. As mentioned above, this velocity error voltage $V_E$ may be used to adjust the phase of the write clock pulses to bring such pulses into phase synchronism with the separated burst signal. The velocity error voltage $V_E$ represents the velocity error, or time drift, of the incoming video signal over the horizontal line interval.

A/D converter 12 converts the velocity error voltage $V_E$ generated by velocity error detector 11 into a corresponding digital signal when the line interval of video signal samples associated with this velocity error is read out of memory 3. In addition, although not shown, this digitized velocity error signal is divided by the number of video signal samples included in each line interval (e. g. 910 samples in the example described herein) so as to produce a digitized velocity error signal representing the velocity error of the first video signal sample read out of memory 3. It is this divided, digitized velocity error signal that is supplied to the input of summing circuit 14.

At the beginning of a horizontal line interval, that is, at the beginning of the line interval during which video signal samples are read out of memory 3, register 15 is reset and the velocity error signal representing the velocity error of the first video signal sample is supplied to summing circuit 14. In response to the first clock pulse that is supplied to terminal 16a of register 15, this digitized velocity error signal is loaded into the register. The contents of register 15, which now are equal to the magnitude of the velocity error signal associated with the first video signal sample read out of memory 3, are summed with the digitized velocity error signal supplied to summing circuit 14, which digitized velocity error signal remains equal to the velocity error divided by the number of samples included in a line interval. Thus, the output of summing circuit 14 now is equal to the sum of the contents of register 15 and the divided, digitized velocity error signal supplied to the input of the summing circuit.

In response to the next clock pulse supplied to terminal 16a, the output of summing circuit 14 is loaded into register 15; and the updated contents of this register are added to the divided, digitized velocity error signal supplied to the input of summing circuit 14. Hence, the output of the summing circuit is increased once again. This operation continues in response to each clock pulse such that the output of summing circuit 14 increases incrementally. FIG. 3B represents this increase in the output of summing circuit 14 which, it is appreciated, corresponds to the integration of the velocity error voltage $V_E$. Since the clock pulses supplied to terminal 16a have a repetition rate equal to the sampling rate of $4f_{sc}$, it is seen, from FIG. 3B, that the output of summing circuit 14 is increased at this sampling rate so as to produce an integrated, discrete velocity error data signal at each clock pulse. Hence, a discrete velocity error data signal is supplied by velocity error data signal generator 13 to velocity error compensator 4 in synchronism with each video signal sample supplied to the compensator from memory 3. Stated otherwise, each discrete velocity error data signal produced by the integrator shown in FIG. 2 is associated with, and represents the velocity error of, a respective video signal sample read out of the memory.

Figure 3B:
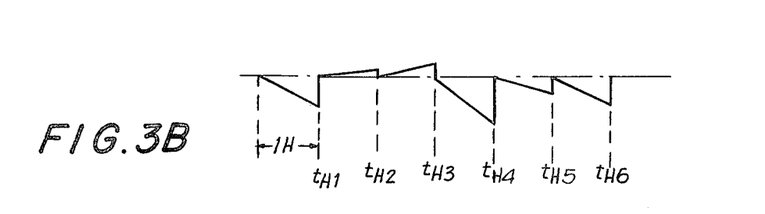

When the last video signal sample included in a line interval is read out, register 15 (FIG. 2) is reset, and the foregoing process is repeated, as illustrated in FIGS. 3A and 3B. Thus, the integrator shown in FIG. 2 functions as a digital integrator to integrate, over a horizontal line interval, the velocity error detected by velocity error detector 11 and digitized by A/D converter 12. It is appreciated that the digital integrator shown in FIG. 2 performs a function analogous to the integrator included in the velocity error corrector described in U.S. Pat. No. 4,165,524.

As an alternative to the digital integrator shown in FIG. 2, each velocity error voltage $V_E$ read out of velocity error detector 11 first may be integrated by a typical analog integrator, and the integrated voltage then may be converted by A/D converter 12 to a digital representation thereof at each clock pulse interval. This, however, requires a high-speed analog-to-digital converter. It is, therefore, preferable to utilize the digital integrator shown in FIG. 2 to produce a digital, integrated velocity error data signal. Thus, velocity error compensator 4 is supplied with successive, discrete velocity error data signals, each representing the velocity error of a respective video signal sample read out of memory 3.

Figure 4:
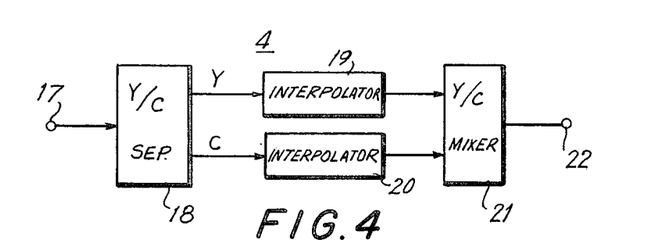
FIG. 4 is a block diagram of the velocity error compensator in accordance with the present invention.

Turning now to FIG. 4, there is illustrated a block diagram of velocity error compensator 4. In the example described wherein the time base corrector and velocity error compensator are used to correct time base and velocity errors in a composite, video signal, the velocity error compensator is provided with separate interpolator circuits 19 and 20 adapted to compensate velocity errors that are present in the samples of the luminance and chrominance components, respectively. Accordingly, interpolator 19 is referred to herein as the luminance component interpolator, and interpolator 20 is referred to as the chrominance component interpolator. The inputs to these interpolators are coupled to a luminance/chrominance separator 18, and the outputs of these interpolators are coupled to a luminance/chrominance combiner 21.

Separator 18 is coupled to an input terminal 17 to receive the consecutive video signal samples read out from memory 3. Separator 18 may be a digital filter of the type described in "Digital TV Comb Filter with Adaptive Features" by John P. Rossi, International Conference on Video and Data Recording, 1976, pages 267–279. Thus separator 18 separates the samples supplied thereto by memory 3 into respective luminance and chrominance component samples. The luminance component samples are compensated, in a manner described below, by interpolator 19; and the chrominance component samples are compensated by interpolator 20. The compensated luminance and chrominance component samples then are combined by combining circuit 21 which, for example, may comprise a digital mixer. This mixer may be constructed as the inverse of digital separator 18 in accordance with the principles described in the aforementioned article. The output of mixer 21 is supplied to output terminal 22 which, in turn, is coupled to output terminal 5 of FIG. 1.

Each of interpolators 19 and 20 is responsive to the discrete velocity error data signals generated by the integrator shown in FIG. 2 and functions to modify the level, or value, of the consecutive luminance and chrominance component samples such that the levels of these samples are made equal to the levels that such samples should have had at the time they were read from memory 3 if there had been no velocity error. This is described in greater detail below.

Figure 5:
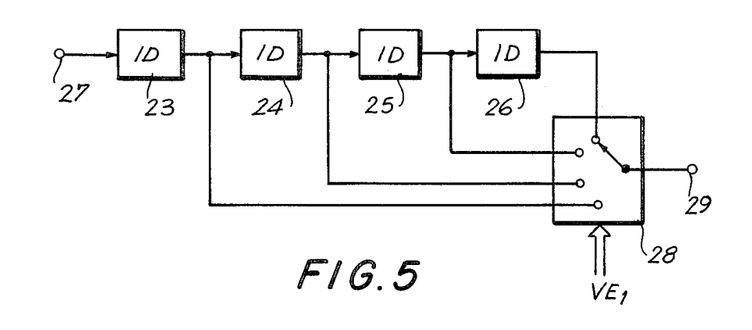
FIG. 5 is a diagram of a variable delay circuit which is used with the present invention in a manner to be described.
Figure 6:
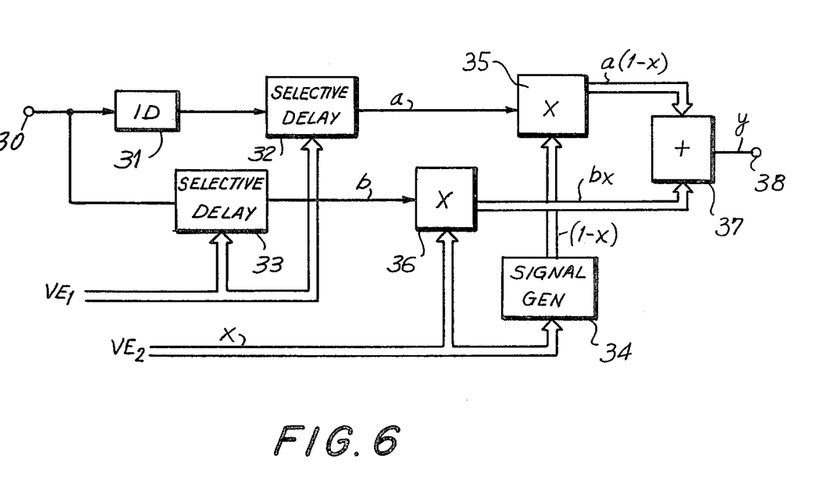
FIG. 6 is a block diagram of an interpolator in accordance with the present invention for compensating luminance component samples having velocity errors therein.

Luminance sample level interpolator 19 is illustrated in FIG. 6. This interpolator is comprised of multiplier circuits 35 and 36, a signal generator 34 and a summing circuit 37. An input terminal 30 is adapted to receive successive luminance samples read out from memory 3 and separated by digital filter 18. Input terminal 30 is coupled to multiplying circuit 35 via a delay circuit 31 and a selective delay circuit 32. Delay circuit 31 is adapted to impart a delay equal to one read clock pulse interval such that the delayed sample appearing at the output thereof is in time coincidence with the next-following sample supplied to input terminal 30. As illustrated, the input terminal also is coupled directly to another selective delay circuit 33. Selective delay circuits 32 and 33 are of similar construction, one embodiment of which is illustrated in FIG. 5. The purpose and operation of the selective delay circuit is described below.

The outputs of selective delay circuits 32 and 33 are coupled to multiplying circuits 35 and 36, respectively. It is appreciated that, because of the one clock pulse interval delay (1D) imparted by delay circuit 31, successive luminance component samples are supplied in time coincidence to multiplying circuits 35 and 36.

A signal $VE_2$ representing the magnitude of the velocity error data signal produced by the integrator shown in FIG. 2 is supplied to multiplier circuit 36. It is recalled that the level, or value, of this velocity error data signal increases incrementally once every clock pulse interval. Hence, the velocity error associated with each of the successive samples supplied to the interpolator shown in FIG. 6 also is supplied to multiplier circuit 36.

It is understood that the velocity error signal produced by the integrator of FIG. 2 represents a timing error, and that the discrete velocity error data signals thus represent time shifts. Typically, the time error represented by the velocity error data signal will be less than the duration 1D of the read clock pulse interval. However, it is possible thact more severe velocity errors may be present, and the time shift represented by the velocity error data signal may, therefore, be greater than one clock pulse interval. For example, the velocity error may be greater than 1D, or greater than 2D, or greater than 3D, and so on. Accordingly, the velocity error data signal may be comprised of a multiple or bits, such as a 10-bit signal, with the more significant bits, such as the two most significant bits, representing whether the velocity error is less than 1D, or between 1D and 2D, or between 2D and 3D, and so on. The remaining bits of lesser significance represent the absolute magnitude of the velocity error. The bits of greater significance of tne velocity error data signal are represented as $VE_1$, and the bits of lesser significance of the velocity error data signal are represented as $VE_2$. As illustrated in FIG. 6, the lesser significant bits $VE_2$ of each discrete velocity error data signal are supplied to multiplier circuit 36. The more significant bits $VE_1$ of each discrete velocity error data signal are supplied to selective delay circuits 32 and 33. The lesser significant bits $VE_2$ represent the velocity error x of each read out luminance component sample.

As also shown in FIG. 6, the lesser significant bits $VE_2$ of the velocity error data signal are supplied to a signal generator 34 which is adapted to produce a mutlibit digital signal representing the difference between one read clock period ID and the velocity error x. Signal generator 34 produces a signal which, for the purpose of the present discussion, has the value $(1-x)$. This signal generator may, for example, comprise a subtracting circuit or, alternatively, an addressable memory having a plurality of storage locations, each storage location storing the digital value $(1-x)$, and each location being addressed by the value x represented by the lesser significant bits $VE_2$ of the velocity error data signal. The output of signal generator 34 is coupled to multiplier circuit 35.

Summing circuit 37 is coupled to the outputs of multiplier circuits 35 and 36 and is adapted to digitally sum, or add, the products produced by each of these multiplier circuits. The output of summing circuit 37 is coupled to an output terminal 38 and supplies thereto a level-compensated luminance component sample. Terminal 38 is, in turn, coupled to a respective input of mixer 21 (FIG. 4).

Figure 7:
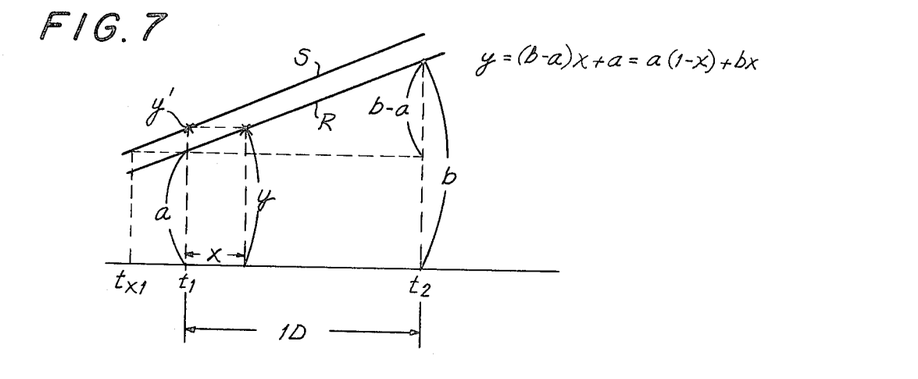
FIG. 7 is a graphical representation which is useful in understanding the operation of the embodiment shown in FIG. 6.

The operation of the interpolator shown in FIG. 6 now will be described with reference to the graphical representation shown in FIG. 7. The line R represents the luminance component that is read out of memory 3 and that contains a velocity error. In particular, sample a is read out at time $t_1$, and the next following sample b is read out at time $t_2$. FIG. 7 illustrates the read clock interval 1D which separates these successive samples a and b. It is assumed that the velocity error of sample a is equal to x, and the value x is represented as the lesser significant bits VE2 of the velocity error data signal that is produced by the integrator shown in FIG. 2 at the time that sample a is read out. As mentioned above, the velocity error represents a time shift in the time at which the sample, in this case sample a, is written into and read out of memory 3. To eliminate this velocity error, sample a should be read out at time $t_{x1}$. Thus, a proper velocity error-corrected luminance component would be represented by the line S shown in FIG. 7. If the luminance samples read out of memory 3 are time shifted so as to cancel the velocity error, the resultant luminance component would be represented by samples which define line S. Hence, the velocity error-corrected sample that is read out of memory 3 at time $t_1$ would have the level, or value, y'. Of course, at time $t_1$, the actual level of the sample is equal to level a which, as is apparent, is time shifted by the amount x from the proper time $t_{x1}$ that it should have been read out. Stated otherwise, the level of sample a that is read out at time $t_1$ would have the value y' if there had been no velocity error in the writing in of the samples. The interpolator shown in FIG. 6 functions to calculate the level y that sample a should have had at time $t_1$ if there had been no velocity error in the luminance component samples.

The trigometric relationship illustrated in FIG. 7 may be expressed as:

$$\frac{b-a}{1} = \frac{y-a}{x} \tag{1}$$

$$y = (b-a)x + a \tag{2}$$

$$y = a(1-x) + bx \tag{3}$$

Signal generator 34, multiplier circuits 35 and 36 and summing circuit 37 of FIG. 6 serve to implement equation (3). Thus, multiplier 36 produces the product bx, where b is the magnitude of the luminance sample presently read out of memory 3, and x is the magnitude of the velocity error as represented by the velocity error data signal produced by the integrator shown in FIG. 2. It will be appreciated that the velocity error of preceding sample a is substantially the same as the velocity error of present sample b such that the velocity error x may be associated with either sample a or sample b.

Multiplier circuit 35 produces the product $a(1-x)$; and summing circuit 37 sums the products of multiplier circuits 35 and 36 to produce the level-compensated sample y in accordance with equation (3). Thus, the compensated sample y has a value which is equal to the value that sample a should have had at time $t_1$ if there had been no velocity error. That is, the value of sample y corresponds to the level of the velocity error-corrected luminance component shown by line S (FIG. 7) at time $t_1$.

Each of selective delay circuits 32 and 33 may be of the construction illustrated in FIG. 5 and comprising cascaded 1D delay elements 23, 24, 25 and 26. Each of these delay elements is adapted to impart a time delay equal to one read clock period. The output of each delay element is coupled to a respective tap of a switching circuit 28 which is schematically illustrated as having a movable contact that is selectively engageable with any one of the illustrated taps thereof. One implementation of switching circuit 28 is a multiplexer having plural inputs, each being selectively connected to an output thereof depending upon a control signal supplied thereto. In FIG. 5, the control signal is comprised of the more significant bits $VE_1$ of the velocity error data signal produced by the integrator shown in FIG. 2. Depending upon the value of these more significant bits $VE_1$, the output of the multiplexer, or switching circuit 28, is coupled to a corresponding one of the inputs, or taps, thereof.

When the selective delay circuit shown in FIG. 5 is used as delay circuit 32 (FIG. 6), input terminal 27 thereof is supplied with successive, delayed luminance component samples a. Likewise, when the selective delay circuit is used as delay circuit 33, input terminal 27 is supplied with successive luminance component samples b. Depending upon the magnitude of the velocity error of the sample supplied to the selective delay circuit, as represented by the more significant bits $VE_1$ of the velocity error data signal, the output of switching circuit 28 is coupled to a respective one input thereof thereby supplying the luminance component sample to output terminal 29 with a delay equal to 1D, 2D, 3D or 4D, depending upon the particular tap to which the output of switching circuit 28 is connected. For example, if the velocity error of the luminance component sample read out from memory 3 is greater than one read clock period, but less than two read clock periods, the movable contact of switching circuit 28 engages the first tap thereof such that the luminance component sample is delayed by the illustrated variable delay circuit by an amount equal to 1D. If the magnitude of the velocity error of the sample supplied to the variable delay circuit is greater than two but less than three read clock periods, the movable contact of switching circuit 28 engages the second tap thereof so as to delay the sample it the variable delay circuit by an amount equal to 2D. Of course, if the magnitude of the velocity error of the luminance component sample is greater than three but less than four read clock periods, or is greater than four read clock periods, the movable contact of switching circuit 28 engages the third or fourth tap thereof, respectively, so tnat the variable delay circuit imparts a corresponding delay to this sample. The selectively delayed samples a and b are supplied from output terminals 29 of variable delay circuits 32 and 33 to multiplier circuits 35 and 36, respectively. The delay imparted by the variable delay circuits thus compensates for a velocity error which is greater in magnitude that a read clock period.

Figure 8:
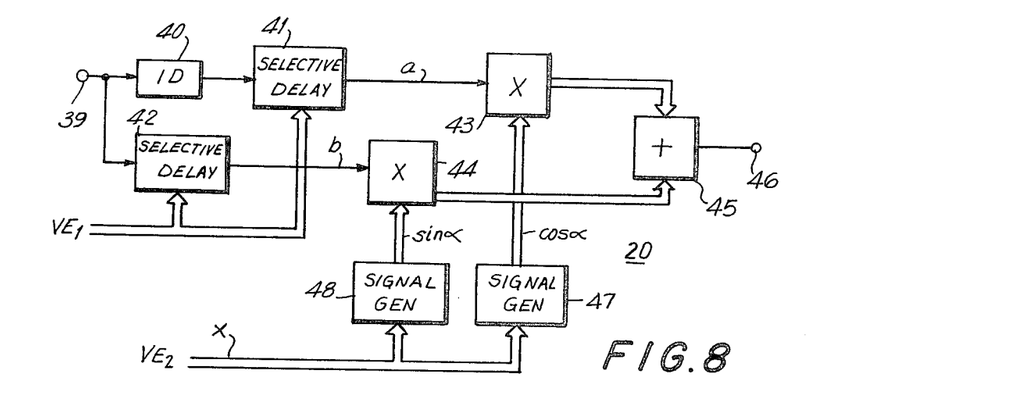
FIG. 8 is a block diagram of an interpolator in accordance with the present invention which compensates chrominance component samples that have velocity errors therein.

Referring now to FIG. 8, there is illustrated a block diagram of chrominance component interpolator 20. This interpolator is provided for the same purpose as the aforedescribed luminance component interpolator, that is, to modify the level, or value, of the chrominance component sample read out from memory 3 such that this level is made equal to the level that it should have had at the time it was read out if there had been no velocity error. The chrominance component interpolator shown in FIG. 8 is comprised of multiplier circuits 43 and 44, a summing circuit 45 and signal generators 47 and 48. Multiplier circuit 43 is coupled, via a delay circuit 40, to an input terminal 39. The input terminal is adapted to receive successive chrominance component samples read out from memory 3. Delay circuit 40 is adapted to delay each of these samples by a time delay equal to one read clock period (1D). Multiplier circuit 44 also is coupled to input terminal 39, and is adapted to receive the chrominance component sample which then is read out from the memory. Thus, by reason of delay circuit 40, multiplier circuits 43 and 44 receive the next-preceding and present chrominance component samples in coinciding time relationship. The next-preceding chrominance component sample a is supplied to multiplier circuit 43, and the present chrominance component sample b is supplied to multiplier circuit 44. In addition, selective delay circuits 41 and 42, which may be similar to aforedescribed delay circuits 32 and 33 and which were described in greater detail with reference to FIG. 5, are connected to the inputs of multiplier circuits 43 and 44, respectively, and serve substantially the same purpose as aforedescribed selective delay circuits 32 and 33. That is, delay circuits 41 and 42 serve to compensate for velocity errors having magnitudes greater than one read clock period. As shown, the more significant bits $VE_1$ of the velocity error data signal produced by the integrator shown in FIG. 2 are supplied to selective delay circuits 41 and 42 and serve to establish the time delay inparted thereby to the chrominance component samples.

Signal generators 47 and 48 are connected to receive the bits of lesser significance $VE_2$ of the velocity error data signal, which bits represent the velocity error x described above. Signal generator 47 is adapted to produce a multi-bit digital signal representing $\cos \pi/2x$, and signal generator 48 is adapted to produce the multi-bit digital signal representing $\sin \pi/2x$. Signal generators 47 and 48 may comprise addressable memory devices having a plurality of storage locations, each location being addressed by the value x represented by the bits of lesser significance $VE_2$, and each addressed storage location storing a digital signal representing $\cos \pi/2x$ and $\sin \pi/2x$, respectively. The outputs of signal generators 47 and 48 are coupled to multiplier circuits 43 and 44, respectively. Multiplier circuit 43 is adapted to produce a digital signal representing the product $a \cos \pi/2x$, and multiplier circuit 44 is adapted to produce a digital signal representing the product $b \sin \pi/2x$. These output signals produced by multiplier circuits 43 and 44 are summed in summing circuit 45 which produces an output signal y, wherein $y = a \cos \pi/2x + b \sin \pi/2x$. This output signal y is supplied to output terminal 46 and is the chrominance component sample that has been compensated to correct for velocity error.

Figure 9A:
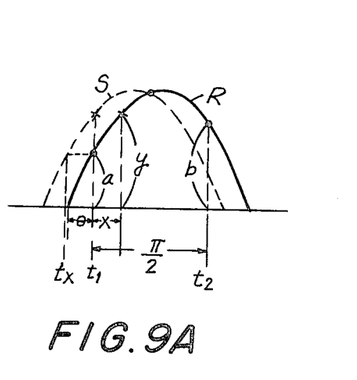
FIGS. 9A and 9B are waveform and phasor diagrams, respectively, which are useful in understanding the operation of the interpolator shown in FIG. 8.
Figure 9B:
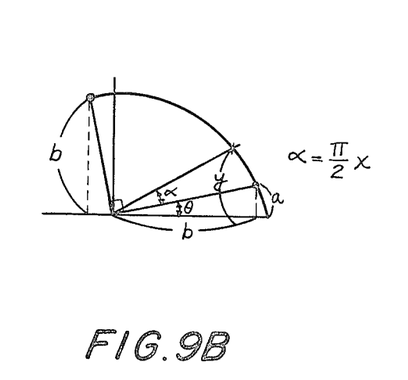

The principle of operation of the interpolator shown in FIG. 8 will best be understood by referring to the graphical representations shown in FIGS. 9A and 9B. It is appreciated that the chrominance component of the video signal is amplitude modulated onto the usual chrominance subcarrier whose frequency is equal to $f_{sc}$. FIG. 9A represents one half-cycle of the amplitude-modulated chrominance subcarrier. Let it be assumed that two successive chrominance component samples that are written into memory 3 and read out therefrom are samples a and b, respectively. Since the input composite color video signal is sampled at the sampling rate $4f_{sc}$, it is appreciated that samples a and b are separated from each other by an angular amount equal to $\pi/2$. Let it be further assumed that samples a and b exhibit the velocity error x, as illustrated. Thus, although sample a is read out of memory 3 at the time $t_1$, because of this velocity error, it should have been read out of the memory at time $t_x$. In the absence of velocity error, the chrominance component would appear as curve S, shown in broken lines in FIG. 9A. However, because of the velocity error in the chrominance component, the actual chrominance component read out of memory 3 appears (in an analog version thereof) as the curve R.

From curve S, it is seen that, in the absence of velocity error x, the chromnance component sample at time $t_1$ would have the value y. The purpose of the interpolator shown in FIG. 8 is to calculate, or interpolate, the sample value y in response to consecutive samples a and b, which consecutive samples are read out of memory 3 at times $t_1$ and $t_2$, respectively. The sample value y can be obtained from the phasor diagram which corresponds to the waveform diagram shown in FIG. 9A. This phasor diagram is illustrated in FIG. 9B.

From FIGS. 9A and 9B, it is appreciated that sample a is obtained at the arbitrary angle $\theta$ of the chrominance subcarrier cycle. FIG. 9B illustrates the vector corresponding to sample a. Of course, the next-following sample b occurs at the angle $\pi/2$ following the occurrence of sample a. FIG. 9B also represents the vector corresponding to sample b. Now, the sample y occurs at a delayed time equal to the velocity error x. The angular representation of this delayed time x is equal to $\alpha$, and it will be appreciated that $\alpha = \pi/2x$. FIG. 9B illustrates the vector corresponding to sample y. It is seen, from FIG. 9B, that samples a and b correspond to the two legs of a right triangle. The hypotenuse of this triangle is, therefore, equal to $\sqrt{a^2+b^2}$. It also is seen that the compensated sample y in FIG. 9B is equal to one leg of another right triangle whose hypotenuse also is equal to $\sqrt{a^2+b^2}$. Accordingly, the value of compensated chrominance component sample y may be expressed as:

$$y = \sqrt{a^2 + b^2} \sin(\alpha + \theta) \quad (4)$$

$$y = \sqrt{a^2 + b^2} (\sin \alpha \cos \theta + \cos \alpha \sin \theta) \quad (5)$$

$$y = \sqrt{a^2 + b^2} \left( \frac{b \sin \alpha}{\sqrt{a^2+b^2}} + \frac{a \cos \alpha}{\sqrt{a^2+b^2}} \right) \quad (6)$$

$$y = b \sin \alpha + a \cos \alpha \quad (7)$$

It is appreciated, therefore, that the interpolator shown in FIG. 8 implements equation (7). In the event that the magnitude of the velocity error x exceeds a read clock period, selective delay circuits 41 and 42 operate in the manner described above with respect to FIG. 5 to compensate for this magnitude of velocity error.

Thus, output terminal 46 (FIG. 8) provides a multi-bit digital signal representing the compensated chrominance component sample y in accordance with equation (7). This compensated chrominance component sample is combined in mixer 21 (FIG. 4) with the compensated luminance component sample produced by the interpolator shown in FIG. 6 so as to provide, at output terminal 22(FIG. 4) compensated samples of the composite color video signal read out of memory 3. It is appreciated, therefore, that the level of each sample read out from the memory is modified to be equal to the level that it should have had at the time it was read out if there had been no velocity error.

While the present invention has been particularly shown and described with reference to a preferred embodiment, it should be readily apparent to those of ordinary skill in the art that various changes and modifications in form and details may be made witnout departing from the spirit and scope of the invention. For example, although the incoming video signal is sampled at the rate $4f_{sc}$, a sampling rate equal to $3f_{sc}$ may be used. It is appreciated that the read clock rate likewise may be equal to $3f_{sc}$. Also, the illustrated time base corrector and velocity error compensator can be used with other periodic information signals and need not be limited solely for use with composite color video signals. Depending upon the composition of such periodic information signals, either interpolator 19 (FIG. 6) or interpolator 20 (FIG. 8) may be omitted.

It is intended that the appended claims be interpreted as including the foregoing as well as other changes and modifications. Furthermore, in the claims, in order to minimize confusion, the luminance component samples are, at times, identified with the subscript "Y", and the chrominance component samples are, at times, identified with the subscript "C".

What is claimed is:

1. Velocity error compensator apparatus for use in a time base corrector of the type having a main memory into which successive samples of a video signal are written at a write-in rate synchronized with time base errors in said video signal, such that plural lines of said video signal are stored in said main memory, and from which said successive samples are read at a constant read-out rate, said velocity error compensator apparatus comprising:

velocity error detecting means for detecting velocity errors in successive lines of said video signals written into said main memory; and     sample level compensating means for compensating the level of a sample read out from said main memory as a function of the detected velocity error, such that said level of said read out sample is modified to be equal to the level that said read out sample should have had at the time it was read out if there had been no velocity error.

2. The apparatus of claim 1 wherein said video signal is a color video signal having luminance and chrominance components; wherein each sample is comprised of a multi-bit digital signal; and wherein said sample level compensating means comprises digital separating means for separating luminance component samples and chrominance component samples from the samples successively read out from said main memory, luminance sample interpolating means coupled to said digital separating means for producing an interpolated luminance sample as a function of successive luminance component samples supplied thereto, said interpolated luminance sample having a value equal to the value that one of said supplied successive luminance component samples should have had at the time it was read out if there had been no velocity error, chrominance sample interpolating means coupled to said digital separating means for producing an interpolated chrominance sample as a function of successive chrominance component samples supplied thereto, said interpolated chrominance sample having a value equal to the value that one of said supplied successive chrominance component samples should have had at the time it was read out if there had been no velocity error, and combining means for combining said interpolated luminance and chrominance samples to produce interpolaced color video signal samples.

3. The apparatus of claim 2 wherein said luminance component interpolating means comprises first multiplying means for multiplying one of said successive luminance component samples by a factor x which is a function of said detected velocity error; second multiplying means for multiplying the next preceding one of said successive luminance component samples by a factor $(1-x)$; and summing means for summing the multiplied samples produced by said first and second multiplying means.

4. The apparatus of claim 3 wherein said velocity error detecting means includes digital integrating means for integrating the detected velocity error over a period of time equal to a horizontal line interval of said video signal so as to produce for each luminance component sample a velocity error digital signal x representing the velocity error of that sample, whereby said factor x is equal to said velocity error digital signal x.

5. The apparatus of claim 4 further comprising delay means for selectively delaying said one and said next preceding luminance component samples by an integral multiple of the sampling interval which separates said one and said next preceding luminance component samples as a function of the magnitude of said velocity error digital signal when said velocity error digital signal exceeds said sampling interval.

6. The apparatus of claim 5 wherein said delay means comprises first and second delay circuits for supplying said one and said next preceding luminance component samples to said first and second multiplying means, respectively, each delay circuit comprising a plurality of cascaded delay elements, each exhibiting a time delay equal to a sampling interval, an output terminal, and switch means responsive to said velocity error digital signal for selectively coupling the output of one of said cascaded delay elements to said output terminal, whereby each delay circuit imparts a delay greater than the magnitude of said velocity error digital signal.

7. The apparatus of claim 2 wherein said chrominance component interpolating means comprises first multiplying means for multiplying one of said successive chrominance component samples by a factor $\sin \alpha$, where $\alpha$ is a function of said detected velocity error; second multiplying means for multiplying the next preceding one of said successive chrominance component samples by a factor $\cos \alpha$; and summing means for summing the multiplied samples produced by said first and second multiplying means.

8. The apparatus of claim 7 wherein said successive chrominance component samples exhibit the repetition frequency $4f_{sc}$, where $f_{sc}$ the chrominance subcarrier frequency of said color video signal; and wherein $\alpha = \pi/2x$, where x represents said velocity error.

9. The apparatus of claim 8 wherein said velocity error detecting means includes digital integrating means for integrating the detected velocity error over a period of time equal to a horizontal line interval of said video signal so as to produce for each chrominance component sample a velocity error digital signal x representing the velocity error of that sample.

10. The apparatus of claim 9 further comprising delay means for selectively delaying said one and said next preceding chrominance component samples by an integral multiple of the sampling interval which separates said one and said next preceding chrominance component samples as a function of the magnitude of said velocity error digital signal when said velocity error digital signal exceeds said sampling interval.

11. The apparatus of claim 10 wherein said delay means comprises first and second delay circuits for supplying said one and said next preceding chrominance component samples to said first and second multiplying means, respectively, each delay circuit comprising a plurality of cascaded delay elements, each exhibiting a time delay equal to a sampling interval, an output terminal, and switch means responsive to said velocity error digital signal for selectively coupling the output of one of said cascaded delay elements to said output terminal, whereby said delay circuit imparts a delay greater than the magnitude of said velocity error digital signal.

12. Velocity error compensator apparatus for use in a time base corrector of the type having sampling means to sample an input periodic information signal at a sampling rate synchronized with time base errors in said information signal to produce successive multi-bit digital samples; a memory coupled to said sampling means for storing plural periods of said samples of said information signal; and read-out means for reading out at a constant read-out rate each period of said samples of said information signal stored in said memory; said apparatus comprising:
 velocity error detecting means for detecting the time base error in said input information signal from one period to the next to produce a velocity error signal for each said period;
 integrating means for integrating each velocity error signal during each period to produce discrete velocity error data signals synchronized with the samples of said information signal and representing the velocity error of respective ones of said samples; and
 interpolating means receiving consecutive samples read out of said memory and a velocity error data signal representing the velocity eror of one of said consecutive samples to produce therefrom a compensated sample having an effective magnitude as a function of said consecutive samples and said velocity error data signal.

13. The apparatus of claim 12 wherein one of said consecutive samples is represented by the multi-bit digital signal b, the next preceding one of said consecutive samples is represented by the multi-bit digital signal a, and said velocity error data signal is represented by the multi-bit digital signal x; and wherein said interpolating means includes means for producing the compensated sample represented by the multi-bit digital signal y, where $y = a(1-x) + bx$.

14. The apparatus of claim 13 wherein said last-mentioned means comprises first multiplying means responsive to said signals b and x for producing the product bx; signal generating means responsive to said signal x for producing the signal $(1-x)$; second multiplying means responsive to said signals a and $(1-x)$ for producing the product $a(1-x)$; and summing means for summing said products to produce the signal $y = a(1-x) + bx$.

15. The apparatus of claim 12 wherein said input periodic information signal is amplitude modulated on a sub-carrier having a frequency one-fourth said sampling rate; wherein one of said co-secutive samples is represented by the multi-bit digital signal b, the next preceding one of said consecutive samples is represented by the multi-bit digital signal a, and said velocity error data signal is represented by the multi-bit digital signal x; and wherein said interpolating means includes means for producing the compensated sample represented by the multi-bit digital signal y, where $y = b \sin \pi/2x + a \cos \pi/2x$.

16. The apparatus of claim 15 wherein said last-mentioned means comprises first signal generating means responsive to said signal x for producing the signal $\sin \pi/2x$; second signal generating means responsive to said signal x for producing the signal $\cos \pi/2x$; first multiplying means responsive to said signals b and $\sin \pi/2x$ for producing the product $b \sin \pi/2x$; second multiplying means responsive to said signals a and $\cos \pi/2x$ for producing the product $a \cos \pi/2x$; and summing means for summing said products to produce the signal $y = b \sin \pi/2x + a \cos \pi/2x$.

17. The apparatus of claim 12 wherein said input periodic information signal is a composite color video signal, and said plural periods are plural horizontal line intervals; and wherein said interpolating means comprises:

separating means for separating samples of the luminance component of said video signal from samples of the chrominance component thereof;

a luminance interpolating circuit for producing a compensated luminance sample represented by the multi-bit digital signal $y_Y$, where $y_Y = a_Y(1-x) + b_Y x$ and $b_Y$ is one of the consecutive luminance component samples, $a_Y$ is the next preceding luminance component sample and x is the velocity error data signal representing the velocity error of one of said consecutive samples;

a chrominance interpolating circuit for producing a compensated chrominance sample represented by the multi-bit digital signal $y_c$, where $y_c = b_c \sin \pi/2x + a_c \cos \pi/2x$ and $b_c$ is one of the consecutive chrominance component samples, $a_c$ is the next preceding chrominance component sample and x is said velocity error data signal representing the velocity error of one of said consecutive samples; and combining means for combining said compensated luminance and chrominance samples to produce successive velocity-error compensated samples of said composite color video signal at said constant read-out rate.

18. The apparatus of claim 17 wherein said luminance interpolating circuit comprises signal generating means responsive to each velocity error data signal x to produce the signal $(1-x)$; first multiplying means for multiplying said sample $b_Y$ and said velocity error data signal x to produce a first product signal; second multiplying means for multiplying said sample $a_Y$ and said signal $(1-x)$ to produce a second product signal; and summing means for summing said first and second product signals to produce said compensated luminance sample.

19. The apparatus of claim 17 wherein said chrominance interplating circuit comprises first signal generating means responsive to each velocity error data signal x to produce the signal $\sin \pi/2x$; second signal generating means responsive to each velocity error data signal x to produce the signal $\cos \pi/2x$; first multiplying means for multiplying said sample $b_c$ and said signal $\sin \pi/2x$ to produce a first product signal; second multiplying means for multiplying said sample $a_c$ and said signal $\cos \pi/2x$ to produce a second product signal; and summing means for summing said first and second product signals to produce said compensated chrominance sample.

20. The apparatus of claim 17 wherein each of said luminance and chrominance interpolating circuits includes selective delay means for imparting a selective time delay to said consecutive samples; and delay selecting means for sensing when said velocity error of respective ones of said consecutive samples exceeds the sampling interval between said consecutive samples to select a time delay as a function of said velocity error.

* * * * *